United States Patent [19]

Jaquess et al.

[11] Patent Number: 5,801,133
[45] Date of Patent: Sep. 1, 1998

[54] EFFECTIVE ALTERNATIVE FILTER CLEANER FOR BIGUANIDE TREATED RECREATIONAL WATER SYSTEMS

[75] Inventors: Percy A. Jaquess, Tigrett; Luis Fernando Del Corral, Memphis, both of Tenn.

[73] Assignee: Buckman Laboratories International Inc., Memphis, Tenn.

[21] Appl. No.: 436,918

[22] Filed: May 8, 1995

[51] Int. Cl.$^6$ .................. C11D 3/20; C11D 3/36; C11D 3/50
[52] U.S. Cl. .................. 510/109; 510/101; 510/162; 510/421; 510/434; 510/436; 510/477; 510/488
[58] Field of Search .................. 252/142, 174.19, 252/174.16, 180, DIG. 6, DIG. 11; 510/434, 436, 469, 488, 162, 510, 421, 109, 477, 101

[56] References Cited

U.S. PATENT DOCUMENTS

| | | | |
|---|---|---|---|
| Re. 28,553 | 9/1975 | von Freyhold | 252/175 |
| 2,326,837 | 8/1943 | Coleman | 510/184 |
| 2,503,381 | 4/1950 | Eichwald | 510/184 |
| 2,631,950 | 3/1953 | Rosenfeld et al. | 134/3 |
| 3,166,444 | 1/1965 | Ehren | 134/3 |
| 3,635,826 | 1/1972 | Hamilton | 252/79.4 |
| 3,661,787 | 5/1972 | Brown, Jr. | 510/477 |
| 4,136,025 | 1/1979 | Zwack et al. | 210/23 |
| 4,207,421 | 6/1980 | Scardera et al. | 568/625 |
| 4,477,364 | 10/1984 | Garcia | 252/142 |
| 4,496,470 | 1/1985 | Kapiloff et al. | 252/181 |
| 4,587,043 | 5/1986 | Muray et al. | 376/310 |
| 4,627,931 | 12/1986 | Malik | 252/153 |
| 4,666,625 | 5/1987 | Shaer et al. | 252/146 |
| 4,668,423 | 5/1987 | Drozd et al. | 252/174.21 |
| 4,675,120 | 6/1987 | Martucci | 252/8.553 |
| 4,683,072 | 7/1987 | Holdt et al. | 252/102 |
| 4,738,876 | 4/1988 | George et al. | 427/299 |
| 4,778,617 | 10/1988 | Shaer et al. | 252/146 |
| 4,806,259 | 2/1989 | Amjad | 252/80 |
| 4,810,405 | 3/1989 | Waller et al. | 252/81 |
| 4,874,537 | 10/1989 | Peterson et al. | 252/95 |
| 4,921,629 | 5/1990 | Malihi et al. | 252/170 |
| 4,965,009 | 10/1990 | Baur et al. | 252/142 |
| 4,970,014 | 11/1990 | Gavcia | 252/79.3 |
| 4,970,015 | 11/1990 | Garcia | 252/79.4 |
| 5,019,288 | 5/1991 | Garcia | 252/79.2 |
| 5,039,441 | 8/1991 | Thomas et al. | 252/142 |
| 5,135,677 | 8/1992 | Yamaguchi et al. | 252/180 |
| 5,324,443 | 6/1994 | Arif et al. | 252/142 |

FOREIGN PATENT DOCUMENTS

| | | |
|---|---|---|
| 59-164398 | 9/1984 | Japan . |
| WO 93/14181 | 7/1993 | WIPO . |

OTHER PUBLICATIONS

World Patent Index Search conducted by Applicants, dated Apr. 26, 1995.

*Primary Examiner*—Ardith Hertzog
*Attorney, Agent, or Firm*—Morgan, Lewis & Bockius LLP

[57] ABSTRACT

An aqueous, biodegradable acid-based cleaner employing a dicarboxylic acid selected from oxalic acid, malonic acid, and tartaric acid and a tricarboxylic acid selected from citric acid and ascorbic acid is disclosed. A method for cleaning a filter used to filter biguanide-treated recreational water is also disclosed.

5 Claims, No Drawings

EFFECTIVE ALTERNATIVE FILTER CLEANER FOR BIGUANIDE TREATED RECREATIONAL WATER SYSTEMS

The present invention relates to a filter cleaner compositions/conditioners for the treatment of filters in biguanide treated recreational waters such as pools or spas. The present invention is particularly suited for sand and diatomaceous earth filters used in pools and spas. These newly developed filter cleaner compositions/conditioners address environmental concerns, in that safe and biodegradable ingredients were employed.

I. Deposit Analysis in biguanide Treated Recreational Waters

Initial observations of deposits on filters and skimmers used in biguanide treated recreational waters were made as unstained preparations (wet-mounts). Based on these initial observations "stellate-hairs" were observed and various types of pigmented material ranging in color between black, yellow and purple were observed encrusted within a "strand-like" gray material. In addition, some unicellular algae were noted within the strand-like material. Deposit material was then dyed with phenol cotton blue to enhance the filaments contrast. Based on these observations the "strand-like" material was observed quite clear, as it stained with phenol cotton blue, in some instances algal clumps and double walled algal filaments were seen within the filaments. The gray "strand-like" material had a strong cohesive nature and was hard to break apart with forceps.

Several analytical evaluations were performed on the deposits to determine both organic and inorganic content Table 1, summarizes all analytical data obtained from deposits from both skimmers and filters. Based on these results, one can distinguish between the filter and skimmer samples, by the higher amounts of silica, typical of filter sand. Interesting was the high amount of iron, silica and extractable organic content with the skimmer samples. Also of Interest from the infrared (IR) spectral analysis was the presence of isonitrile/isocyanate (band 2170 $cm^{-1}$) and amide and/or amine bands at 1725 and 1563 $cm^{-1}$ respectively, (the presence of other amide or amine compounds is also possible. Bands seen at 1725, 1272, 1110, and 724 $cm^{-1}$ indicate the likely presence of polyester resin resembling very closely to the IR spectrum of polyethylene terephthalate. The deposit analysis is shown in Table 1, below.

For comparative purposes an IR spectrum was obtained for the biguanide sanitizer, SoftSwim™, a product of BIO-LAB, INC., Decatur, Ga. This revealed the presence of the same isonitrile/isocyanate and amide and/or amine functional groups. Similar homologous areas were observed for the deposit samples analyzed. However no polyester groups were observed in the biguanide sanitizer infrared scans.

TABLE 1

Summary of analytical data on skimmer and filter deposits

| | SAMPLE # | | | |
|---|---|---|---|---|
| | 1. (Skimmer) | 2. (filter) | 3. (filter) | 4. (skimmer) |
| ASSAY | | | | |
| Spot test: Carbonate: | negative | negative | negative | negative |
| Ash content: ORGANIC | 29.1% | 72.2% | 99.7% | 40.0% |

TABLE 1-continued

Summary of analytical data on skimmer and filter deposits

| | SAMPLE # | | | |
|---|---|---|---|---|
| | 1. (Skimmer) | 2. (filter) | 3. (filter) | 4. (skimmer) |
| CONTENT | | | | |
| Total extractables: (toluene-ethanol) | 7.7% | 1.7% | 1.0% | 19.9% |
| FTIR analysis: (infrared) | isonitrile/ isocyanate & amide and/or amine bands polyester resin: polyethylene terephthalate-like | isonitrile/ isocyanate & amide and/or amine bands polyester resin: polyethylene terephthalate-like | nd | isonitrile/ isocyanate & amide and/or amine bands polyester resin: polyethylene terephthalate-like |
| INORGANIC CONTENT | | | | |
| Calcium as CaO | 5.6% | 1.2% | 1.2% | 3.3% |
| Magnesium as MgO | 1.4% | <0.2% | <0.2% | 1.4% |
| Iron as Fe2O3 | 8.4% | 0.8% | <0.2% | 1.4% |
| Silica as SiO2 | 54.7% | 87.8% | 89.8% | 64.5% |
| Aluminum as Al2O3 | 15.1% | 1.8% | 1.8% | 16.7% |
| Copper as CuO | 6.6% | 1.8% | <0.2% | 0.4% |
| Zinc as ZnO | 0.9% | <0.2% | <0.2% | 1.0% |
| Phosphorus as P2O5 | <2.3% | <0.2% | <2.3% | <1.2% |
| Sulfur as SO3 | 2.5% | <2.3% | <1.3% | <1.3% |
| Manganese as MnO | <0.2% | <1.3% | <0.2% | nd |
| Titanium as TiO2 | 0.8% | <0.2% | <0.2% | nd | nd, not determined

II. Active Ingredient Screening and Selection Methodology

Small amounts of deposit samples from selected fouled filters from biguanide treated pools in the southern U.S., around Atlanta, Ga., were obtained for analysis. Samples were stripped apart with forceps and weighed to approximately (average wet weight) 0.4 grams (test sample). The small sample was then introduced to a reaction vessels (50 ml beakers) with 40 milliliters of 8% formulated or unformulated ingredient in tap water (low hardness) at room temperature. Visual observations were made for deposit decomposition/dissolution. A wire loop was employed to test for the tensile strength of the deposit as compared to untreated samples (tap water). Observations were made up to 24 hours post-treatment.

Based on the preliminary results shown in Table 2, pH alone did not appear to be a determining factor in the decomposition of the deposit. As discussed below, only certain organic acids were able to effectively dissolve the deposit. Among 27 organic acids tested, only 9 effectively dissolved the deposit within reasonable period of time (2-24 hrs). These results are shown in Table 2 below.

Based on these results certain dicarboxylic acids, tricarboxylic acids, and a phosphonic acid were taken on for further investigation. Specifically, the dicarboxylic acids are selected from the group consisting of oxalic acid, malonic acid, and tartaric acid; and the tricarboxylic acids selected from the group consisting of citric acid and ascorbic acid. The phosphoric acid was 1-Hydroxyethylidne-1,1-bis (phosphonic acid), (Phos-6). Table 3 shows the effectiveness of these organic acids by testing them upon dilution (<10%).

TABLE 2

Screening of potential organic acids
for dissolving/decomposing biguanide filter deposits.

| | | Decomposition/Dissolve | |
|---|---|---|---|
| Ingredient | pH at 8.0% | ≦2 hours | 24 hours |
| Potassium Formate | 7.6 | no | no |
| Formic acid | 2.0 | no | yes |
| Oxalic acid | 1.6 | yes | nd |
| Acetic acid | 2.0 | partial | yes |
| Potassium acetate | 8.3 | no | no |
| Tricloroacetic acid | 1.5 | no | no |
| Glycolic acid | 2.0 | partial | nd |
| Peracetic acid (5%) | 2.7 | no | nd |
| Sodium propionate | 2.3 | no | no |
| Propionic acid | 2.2 | no | nd |
| Malonic acid | 1.9 | yes | nd |
| Sodium lactate | 5.4 | no | no |
| Lactic acid | 2.0 | no | nd |
| Malic acid | 2.0 | no | no |
| Citric acid | 2.1 | yes | nd |
| Ascorbic acid | 2.2 | yes | nd |
| Sodium benzoate | 7.3 | no | no |
| Dehydroacetic acid | 8.5 | no | no |
| Tannic acid | 2.5 | no | no |
| Tartaric acid | 2.0 | yes | nd |
| Phos 6 (30%) | 1.8 | yes | nd |
| Phos 2 | 1.8 | no | nd | nd = not determined
Phos-2 = aminotris(methylenephosphonic acid), 50% aqueous solution

TABLE 3

Screening of unformulated organic acids, upon dilution less than 10%

| | | Decomposition of Deposit After: | | | | |
|---|---|---|---|---|---|---|
| Active ingredient | Percent | 2 hr | 4 hr | 6 hr | 8 hr | 24 hr |
| Control (Water) | — | − | − | − | − | − |
| Unformulated Citric acid | 8 | + | nd | nd | nd | nd |
| | 7 | + | nd | nd | nd | nd |
| | 5 | + | nd | nd | nd | nd |
| | 3 | + | nd | nd | nd | nd |
| | 1 | + | nd | nd | nd | nd |
| | 0.25 | − | − | − | − | − |
| Unformulated Tartaric acid | 8 | + | nd | nd | nd | nd |
| | 7 | + | nd | nd | nd | nd |
| | 5 | + | nd | nd | nd | nd |
| | 3 | ± | + | nd | nd | nd |
| | 1 | ± | + | nd | nd | nd |
| | 0.25 | ± | + | nd | nd | nd |
| Unformulated Oxalic acid | 7 | + | nd | nd | nd | nd |
| | 5 | − | − | ± | nd | nd |
| | 3 | − | − | + | nd | nd |
| | 1 | − | − | + | nd | nd |
| | 0.25 | − | − | − | − | − |
| | 0.125 | − | − | − | − | − |
| Unformulated Ascorbic acid | 8 | ± | ± | ± | nd | nd |
| | 7 | ± | ± | ± | nd | nd |
| | 5 | ± | ± | ± | nd | nd |
| | 3 | − | − | − | − | − |
| | 1 | − | − | − | − | − |
| | 0.25 | − | − | − | − | − |
| Unformulated Malonic acid | 8 | ± | + | nd | nd | nd |
| | 7 | ± | + | nd | nd | nd |
| | 5 | ± | + | nd | nd | nd |
| | 3 | − | − | − | − | − |
| | 1 | − | − | − | − | − |
| | 0.25 | − | − | − | − | − |
| Unformulated Phos 6, 30% | 8 | + | nd | nd | nd | nd |
| | 7 | + | nd | nd | nd | nd |

TABLE 3-continued

Screening of unformulated organic acids, upon dilution less than 10%

| | | Decomposition of Deposit After: | | | | |
|---|---|---|---|---|---|---|
| Active ingredient | Percent | 2 hr | 4 hr | 6 hr | 8 hr | 24 hr |
| aqueous solution | 5 | + | nd | nd | nd | nd |
| | 3 | + | nd | nd | nd | nd |
| | 1 | ± | + | nd | nd | nd |
| | 0.25 | ± | + | nd | nd | nd | nd = not determined
(±) partial decomposition (filaments did not dissolved completely, but tensile strength was lost)
(+) total dissolution,
(−) no effect III. Formulation and Combination of Organic Acids Various combinations of organic acids were tested to determined their effectiveness against deposits from biguanidine treated recreational waters. The active organic acids were combined and formulated with common, natural biodegradable adjuvants. Such adjuvants include but are not limited to fragrances or surfactants. Preferable fragrances are citrus terpene such as lemon, lime, lemon-lime, and other citric fragrances as described in U.S. Pat. No. 4,683,072 which is incorporated here by reference. The surfactant is preferably a non-ionic surfactant such as the "Neodol" surfactants of Shell Oil Company, the "Tergitol" surfactants of Union Carbide Company, and the "Alfol" surfactants of Continental Oil Company. Specific surfactants include "Neodol 25-7" (linear $C_{12}$–$C_{15}$ primary alcohol condensed with 7 moles of ethylene oxide per mole of alcohol), "Neodol 45-7" (linear $C_{12}$–$C_{15}$ primary alcohol condensed with 7 moles of ethylene oxide per mole of alcohol), "Tergitol 15-S-7" (random secondary $C_{11}$–$C_{15}$ alcohol condensed with 7 moles of ethylene oxide per mole of alcohol), and "Alfol 1416-6.5" (primary $C_{14}$–$C_{16}$ alcohol condensed with 6.5 moles of ethylene oxide per mole of alcohol).

Formulations may be prepared by mixing the organic acids in water using techniques known in the art Specific prototype formulations were prepared as follows:

Prototpe A:
1. Clean reactor, need not be dry.
2. Charge 494 lb. of water to reactor.
3. Start stirring.
4. Charge 45 lb. of oxalic acid to the rector. Agitate ½ hour.
5. Charge 90 lb. of citric acid to the reactor. Agitate ½ hour.
6. Charge 270 lb. of Phos 6 to the reactor.
7. Charge 1 lb. of fragrance, d-limonene, to the reactor.
8. Agitate reactor contents for one hour.

Prototype B:
1. Clean reactor, need not be dry.
2. Charge 693 lb. of water to reactor.
3. Start stirring.
4. Charge 67.5 lb. of oxalic acid to the reactor. Agitate ½ hour.
5. Charge 90 lb. of citric acid to the reactor. Agitate ½ hour.
6. Charge 45 lb. of Neodol 25-7 surfactant to the reactor.
7. Charge 4.5 lb. of fragrance, d-limonene, to the reactor.
8. Agitate reactor contents for one hour.

As shown in Table 4, formulation prototypes A and B were effective in dissolving the biguanide deposit within a 24 hour period. The formulated prototypes dissolved the deposit at lower concentrations in combination than the unformulated, individual organic acids.

TABLE 4

Efficacy on dilution (two-fold) of formulated prototypes to degrade/dissolve biguanide filter deposits

| Formulated Prototypes | Dilution | Total decomposition/dissolution ≦2 hrs | 24 hrs |
|---|---|---|---|
| PROTOTYPE A | 1:2 | yes | nd |
| | 1:4 | yes | nd |
| | 1:8 | yes | nd |
| | 1:16 | yes | nd |
| | 1:32 | yes | nd |
| | 1:64 | yes | nd |
| | 1:128 | no | yes |
| | 1:256 | no | yes |
| | 1:512 | no | yes |
| | 1:1024 | no | yes |
| PROTOTYPE B | 1:2 | yes | nd |
| | 1:4 | yes | nd |
| | 1:8 | yes | nd |
| | 1:16 | yes | nd |
| | 1:32 | yes | nd | nd = not determined.

The above decomposition dilution rates are laboratory comparative data employed to compare efficacy between filter cleaners. In normal filter applications, dilution's rates might be more conservative, depending on degree of encrustion and filter cleaner permeation rates into the filter bed.

Accordingly, the present invention relates to an aqueous, biodegradable acid-based cleaner. The cleaner contains 0.25–15% by weight of at least one dicarboxylic acid selected from the group consisting of oxalic acid, malonic acid, and tartaric acid; 1–15% by weight of at least one tricarboxylic acid selected from the group consisting of citric acid and ascorbic acid; and the balance being water, Preferably, the cleaner contains 2 to 8% by weight of the dicarboxylic acid, more preferably 5 to 7.5% by weight, and 5–12% by weight of the tricarboxylic acid, more preferably 10% by weight. When the cleaner contains a fragrance, the fragrance can be added in an amount of 0.05 to 2% by weight and more preferably 0.1% to 0.5% by weight, surfactants may be added in amounts of 0.05 to 20% by weight, more preferably 5 to 15% by weight, and most preferably 5.0% by weight.

In another embodiment, the aqueous, biodegradable acid-based cleaner may also contain 1–40% by weight of 1-Hydroxyethylidene-1,1-bis (phosphonic acid), Phos-6. Preferably, the Phos-6 is present in 25–40% by weight and most preferably 40% by weight.

IV. Re-conditioning biguanide filters used in biguanide treated recreational waters: cleaning, sand, diatomaceous earth (D.E.) and cartridge filters Another embodiment relates to a method for cleaning a filter used to filter biguanide-treated recreational water. The method comprises the step of contacting the filter with aqueous solution of a dicarboxylic acid selected from the group consisting of oxalic acid, malonic acid, and tartaric acid; a tricarboxylic acid selected from the group consisting of citric acid and ascorbic acid; or 1-Hydroxyethylidene-1,1-bis (phosphonic acid) for a time sufficient to restore the filtering capacity of the filter.

The present invention identifies and formulates certain organic acids which are capable of dissolving troublesome guanidine-related deposits very effectively within 24 hours. Application of the organic acids could possibly deter filter "channeling" from occurring and therefore preventing filter ineffectiveness. The organic acids will also destabilize mineral calcifications on filters or skimmers. Such calcifications generally form due to improper pH balance or total alkalinity of the water is not monitored. The cleaning compositions/conditioners of the invention are generally biodegradable and conform with most discharge restrictions stated by the NPDES (U.S.). As one or ordinary skill would understand, the amount of cleaning composition/conditioner applied will depend on size of filter capacity, sine filter size is governed by the size of the body of water. Filters are generally cleaned at least once or twice a season.

For permanent medium filter systems (rapid sand, high rate sand) and some D.E filters: Backwash thoroughly. Shut down filtration system-(pump), close valves to body of water (pool). Drain filter water level to at least one third of its total water capacity (if practical). Introduce same volume of cleaner as drained. Add cleaner to filter via inlet, (sand fill or anode ports or pressure gauge inlet hole). Let soak for 12–24 hours before backwashing. Then, open suction valves and with the filter still in backwash position, start pump and backwash until waste is clean, return to normal operation.

For D.E. and cartridge filters, remove elements from filter, rinse off loose debris and soak overnight in plastic container, containing 1 quart of filter cleaner per 5 gallons of water. Clean and rinse thoroughly with water. Place elements in filter and resume normal operation.

Stricter washing requirements may be necessary for high rate sand filters, since deposits could develop deeper within the sand bed. For neglected filters, two consecutive 24 hour treatment applications may be needed. Add additional instructions relevant for disposal or reutilization of disposable media systems, such as D.E. As a caution regarding pools with erosion type chlorinators, always close inlet to chlorinator or remove chlorinator canister from unit before using filter cleaners.

The claimed invention is:

1. An aqueous, biodegradable acid-based cleaner consisting of:
   5–7.5% by weight of at least one dicarboxylic acid selected from the group consisting of oxalic acid, malonic acid, and tartaric acid;
   5–12% by weight of at least one tricarboxylic acid selected from the group consisting of citric acid and ascorbic acid;
   1–40% by weight of 1-Hydroxyethylidene-1,1-bis (phosphonic acid);
   optionally, 0.05–2.0% by weight of a fragrance; and
   optionally, 0.05–20% by weight of a surfactant;
   and the balance being water.

2. An aqueous, biodegradable acid-based cleaner of claim 1, wherein said fragrance is present.

3. An aqueous, biodegradable acid-based cleaner of claim 1, wherein said surfactant is present.

4. An aqueous, biodegradable acid-based cleaner consisting essentially of:
   5–7.5% by weight of at least one dicarboxylic acid selected from the group consisting of oxalic acid, malonic acid, and tartaric acid;
   5–12% by weight of at least one tricarboxylic acid selected from the group consisting of citric acid and ascorbic acid;
   1–40% by weight of 1-Hydroxyethylidene-1,1-bis (phosphonic acid);
   0.05–2% by weight of a fragrance selected from the group consisting of lemon, lime, and lemon-lime;

0.05–20% by weight of a nonionic surfactant; and the balance being water.

5. The aqueous, biodegradable acid-based cleaner of claim 4 wherein the fragrance is a lemon citrus terpene and wherein the nonionic surfactant is a linear $C_{12}$–$C_{15}$ primary alcohol condensed with 7 moles of ethylene oxide per mole of alcohol.

* * * * *